United States Patent
Finn et al.

[11] Patent Number: 5,770,807
[45] Date of Patent: Jun. 23, 1998

[54] APPARATUS FOR TAKING UP AND GUIDING A CONNECTION DEVICE

[76] Inventors: David Finn, Konig-Ludwig-Weg 24, D-87459 Pfronten; Manfred Rietzler, Am Alsterberg 10, D-87616 Marktoberdorf, both of Germany

[21] Appl. No.: 737,349
[22] PCT Filed: May 11, 1995
[86] PCT No.: PCT/DE95/00642
  § 371 Date: Nov. 4, 1996
  § 102(e) Date: Nov. 4, 1996
[87] PCT Pub. No.: WO95/32073
  PCT Pub. Date: Nov. 30, 1995

[30]     Foreign Application Priority Data
May 19, 1994 [DE] Germany ............................ 44 17 625.2
[51] Int. Cl.$^6$ ................................................... B23K 11/24
[52] U.S. Cl. ..................................... 73/862.541; 219/86.51
[58] Field of Search ......................... 73/862.541, 862.56; 324/757; 173/4, 11, 13, 15, 202; 219/85.19, 86.51; 29/407.8

[56]     References Cited
U.S. PATENT DOCUMENTS

| | | | |
|---|---|---|---|
| 4,229,637 | 10/1980 | Dederer et al. | 219/86.51 |
| 4,914,602 | 4/1990 | Abe et al. . | |
| 5,074,038 | 12/1991 | Fath . | |
| 5,138,127 | 8/1992 | Fries et al. | 219/86.51 |

FOREIGN PATENT DOCUMENTS

| | | | |
|---|---|---|---|
| 0 370 451 | 3/1982 | European Pat. Off. . | |
| 40 38 658 | 6/1991 | Germany . | |
| 093 008 951 | 5/1993 | WIPO | 219/86.51 |

*Primary Examiner*—Robert Raevis
*Attorney, Agent, or Firm*—Darby & Darby

[57]     ABSTRACT

An apparatus for taking up and guiding a tool device, especially a connection device, comprises a feed device that can move along a feed axis by a servo-element. A take-up device moves along an axis so that the take-up device can move relative to the feed device. A force measuring device is disposed on the feed device. An elastic element is disposed between the force measuring device and the take-up device so that the elastic element is deformed when a relative motion takes place between the force measuring device and the take-up device.

14 Claims, 3 Drawing Sheets

APPARATUS FOR TAKING UP AND GUIDING A CONNECTION DEVICE

BACKGROUND OF THE INVENTION

1. Field of the Invention

The present invention relates to an apparatus for taking up and guiding a tool device, especially a connection device.

2. Discussion of the Related Art

To automate the production of electrically conducting connections between contact elements, such as, for instance, the contact areas of a chip and the leads connected thereto, pneumatic apparatuses were previously used for this as a rule. The actual connection device here can be designed, for instance, as a thermo-compression device, and it is moved along a feed axis of the apparatus toward the connection point of the contact elements. In the case of a thermo-compression device, the action of pressure and temperature will thus make a solder or weld joint between the contact elements. Adjusting the force with which the connection device is moved toward the connection point, so as to produce the connection pressure there, represents an optimization problem. On the one hand, if a thermo-compression process is involved, a connection pressure matched to the connection temperature must be set; on the other hand, the connection pressure may not exceed a given maximum, so as to prevent mechanical damage to sensitive micro-electronic components.

In a well-known apparatus, the connection device is moved by means of a pneumatic positioning cylinder toward the connection point, such that the positioning cylinder at the same time also creates the necessary connection pressure. The pneumatic positioning cylinder consists of a piston/cylinder unit, in which mechanical friction forces are created due to the piston being guided in the cylinder. In addition, these friction forces vary over the piston stroke. The result of this is that, even if the air pressure is adjusted to be constant, the connection force that is actually exerted on the connection point by the pneumatic positioning cylinder will vary. To this must be added compressibility effects of the air, so that the known apparatus cannot produce an exactly reproducible force at the connection point and a corresponding connection pressure. In mass production of such connections, this results in a relatively high reject rate.

The EP-A-0 476 912 describes an apparatus for taking up and guiding a tool device which has a take-up device for taking up the tool device, said take-up device being movable by means of a servo-element along a feed axis through a feed device, as well as a force measuring device. In the known apparatus, the force measuring device is an integral component of the take-up device.

The SU-A-1 574 405 describes an apparatus which makes possible a deformation measurement in a wire conductor subject to a welding process.

It is an object of the present invention to create an apparatus of the type mentioned in the introduction, which makes it possible to set a precisely reproducible connection force at a connection point and which thus reduces significantly the reject rate in the production of such connections.

This object is achieved by an apparatus that comprises a feed device that can move along a feed axis by means of a servo-element, and a take-up device which can move along a motional axis in such a way that the take-up device can move relative to the feed device, a force measuring device being disposed on the feed device and an elastic element being disposed between the force measuring device and the take-up device in such a way that the elastic element is deformed when a relative motion takes place between the force measuring device and the take-up device.

The inventive apparatus makes it possible for the connection device to execute a feed motion toward the connection point, which depends directly on the force. At the same time, the inventive apparatus makes it possible, by means of the elastic element connected between the force measuring device and the take-up device, to attenuate the impact shock, when the connection device strikes the connection point. The elastic element makes it possible to decouple the mass between the take-up device and the feed device, so that the impact mass is significantly reduced. As regards vibration mechanics, the elastic element is here in series with the take-up device and the force measuring device, so that the elastic force created by the deformation of the elastic element does not garble the force signal generated by the force measuring device.

The inventive apparatus is not limited to application in the field of connection technology, but, regardless of the application, for example also in the field of SMD technology, it makes it possible for the feed device to execute a force-dependent feed motion until it has reached a given contact pressure corresponding to the force measurement signal. Since the actual pressure force prevailing e.g. at the connection point is measured by the force measuring device, the contact pressure force generated thereby can be exactly reproduced arbitrarily often.

A preferred embodiment of the inventive apparatus is such that, in order to move the feed device along the feed axis, a rotary drive, preferably designed as a spindle drive, and coupled to the servo-element, is used. This provides a drive for the feed device, which can be controlled especially exactly in the directions of the two feed axes.

It is advantageous if the the feed device is designed as a feed sled, and a sled guide is used to form the feed axis. In this way, the feed device can be moved in the simplest manner possible exactly with respect to a frame.

If the take-up device is designed as a take-up sled, and a sled guide is used at the feed sled so as to form the axis of motion, it is possible to construct the entire apparatus as compact as possible and of basic elements that are essentially coincident.

As an alternative to the above sled design of the take-up device, it is also possible to provide a guide bore in the feed sled to guide the take-up device, and to guide therein the appropriately designed take-up device. For example, this offers the possibility of using a linear guide, designed as a ball-type liner, to guide the take-up device.

If the elastic element is designed as a spring, for example as a coil spring, the damping desired for the impact shock can be adjusted in an especially simple way by selecting a spring with a suitable spring constant.

In addition to the elastic element, a damping element can also be used, which can be constructed separately or which can be combined with the spring element to form a spring/damping unit. Here the damping element serves to attenuate the motion along the motional axis of the take-up device.

It is especially advantageous if the force measuring device is a component of a control loop, in such a way that the output signal of the force measuring device serves as the current value for applying pressure to a connection point and as an input signal for an rpm-control device of the servo-element, which preferably is designed as an electric motor. To compensate the inherent weight of the arrangement suspended at the force measuring device, a null equalization measurement can be made for the force.

In this way, it is not only possible to move the take-up device, together with the connection device disposed therein, toward the connection point under force control, until the force measurement device generates an output signal corresponding to the maximum of the connection pressure, but rather it is also possible to regulate the force in such a way that, if the permissible maximum is exceeded, the output signal will effect a negative feed motion, that is a motion away from the connection point. Disposing the force measurement device within a control loop thus makes it possible to feed the connection device at relatively high speed until it strikes the connection point, and then to adjust the contact pressure appropriate for making the connection by means of suitable feed motions both in the negative and in the positive direction.

In order to limit the impact shock, it is also possible to design the apparatus such that a positioning device is associated with the servo-element, in such a way that the feed motion of the feed device can be executed at a higher rpm until a prescribed feed distance is reached between the connection device and the connection plane. This advantageous modification thus first of all makes it possible to control the path until the set feed distance has been reached and subsequently to set the connection pressure correctly by means of the force control.

By forming an analog control loop, a force limiting element, designed e.g. as a potentiometer, can be associated with the force measurement device. In this way, a precise adjustment of the maximum value for the force output signal becomes possible.

Furthermore, it is also possible to associate a microprocessor unit with the force measurement device in order to form a digital control loop. This will convert the analog output signal of the force measuring device into a digital output signal. Forming a digital control loop makes it possible to equip the inventive apparatus with a program control, such as to enable e.g. computer-supported operation of the apparatus. In this way, maximum values for the force output signal can be prescribed so as to change regularly or irregularly as needed, so as to make possible continuous operation of the inventive apparatus even if the parameters for making the connection change.

BRIEF DESCRIPTION OF THE DRAWING FIGURES

Preferred embodiments of the inventive apparatus will be explained in more detail below by means of the drawings.

DETAILED DESCRIPTION OF A PREFERRED EMBODIMENT

Figure 1:
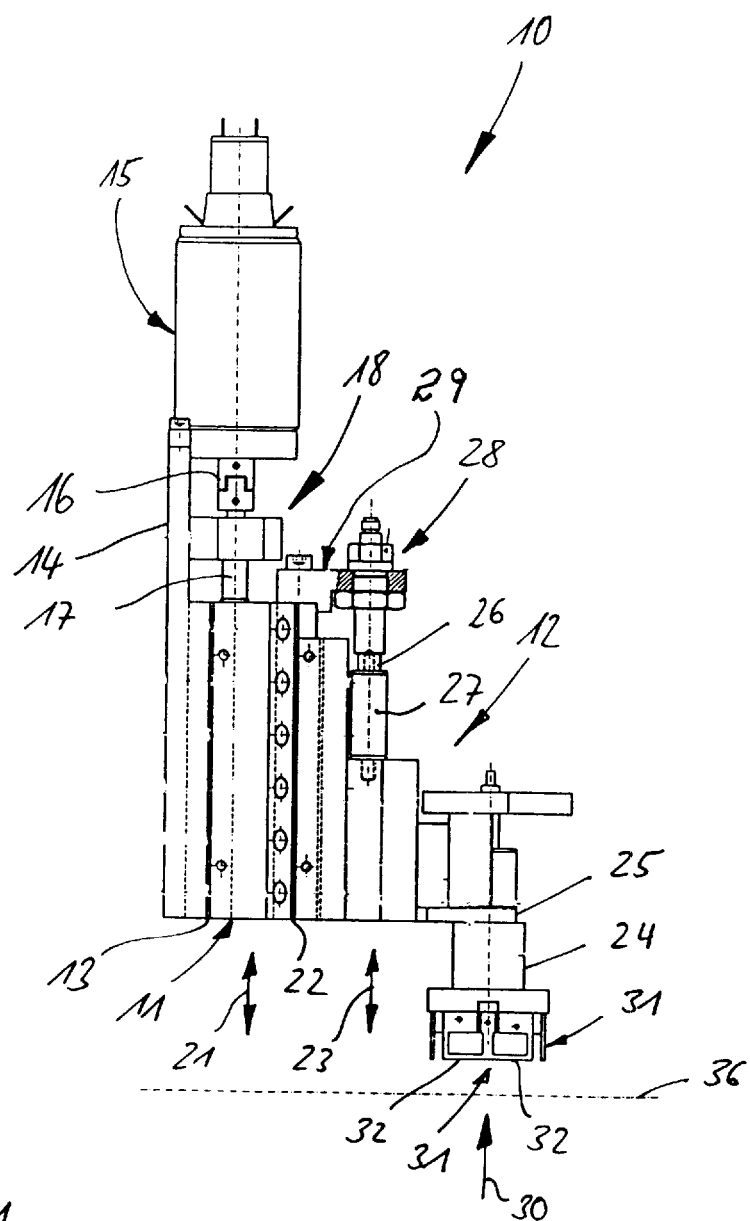
FIG. 1 shows a take-up/guide apparatus in a first embodiment with a feed device and a take-up device, in a side view.

FIG. 1 shows a take-up/guide apparatus 10 with a feed device 11 and a take-up device 12. The feed device 11 is designed as a feed sled, which is guided in a sled guide 13 on a frame 14.

A servomotor 15 is disposed on the frame 14 above the feed sled 11. It is connected, via a shaft coupling 16, to a spindle shaft 17 of a spindle drive 18.

Figure 2:
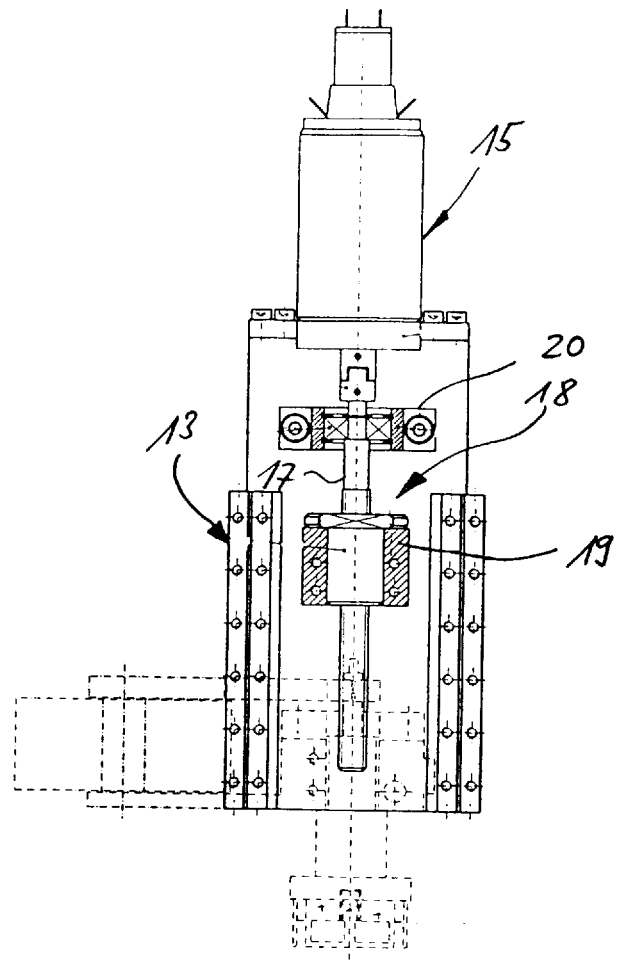
FIG. 2 shows the take-up/guide apparatus with the feed sled removed.

As can be seen from FIG. 2, the spindle drive 18 comprises not only the spindle shaft 17 but also a spindle nut 19, which is connected to the feed sled 11. In this way, a rotation of the spindle shaft 17 in the spindle nut 19, which is inserted in the feed sled 11, causes a lengthwise movement of the feed sled 11 in the sled guide 13. As another bearing point, the spindle shaft 17 has not only the spindle nut 19 but also a pedestal bearing 20 disposed at the frame 14 above the feed sled 11.

The longitudinal motion of the feed sled 11 with respect to the frame 14 is indicated in FIG. 1 by the double arrow 21. Furthermore, FIG. 1 shows that the feed sled 11 also has a sled guide 22 on that side which is opposite the frame 14, so as to take up the take-up device, which is designed as a take-up sled 12. The sled guide 22 has e.g. a linear ball-type guide and makes possible guidance of the take-up sled with as little friction as possible; in the direction of the double arrow 23, that is, in the embodiment shown here, parallel to the first sled guide 13.

In this case, the take-up sled 12 takes up a connection device 24 in a mount 25. The connection device is here designed as a thermo-compression device. The mass formed by the take-up sled 12 and the connection device 24 is suspended on a coil spring 26, which is guided in a buckling sleeve 27 that is connected to the take-up sled 12. One end of the coil spring 26 is here connected to the take-up sled 12, and the opposite end of the coil spring 26 is connected to a force measuring device 28. The latter is connected, via a mount 29, to the feed sled 11.

The present description, together with FIG. 1, clearly shows that a reaction force 30, acting on the connection device 24, is transferred via the connection device 24, the take-up sled 12, and the coil spring 26, directly to the force measuring device 28. Neglecting the friction forces existing in the sled guide 22 and the interior friction forces of the coil spring 26, the reaction force 30 acting on the connection device 24 thus is equal to the measurement force applied via the coil spring 26 to the force measuring device 28. The accuracy of the force transmission system thus essentially depends on the structure of the sled guide 22 being as frictionless as possible. Further, it depends on an elastic element, which in this case is designed as a coil spring 26 with as little hysteresis as possible. It also depends on the force measuring device 28 that is used in the system.

With presently available, appropriate structural elements, it can therefore be assumed that force will be transmitted essentially without loss or hysteresis, and that the reaction force 30 will be equal to the measurement force.

The connection device 24 shown in FIG. 1 is designed, by way of example, as a thermo-compression device. It has three identical thermode inserts 31, whose contact sites to a connection point, which is not shown in more detail, have constricted cross sections 32. When current flows through them, they heat up and apply pressure and heat to the connection points. The connection device 24 here serves to make a connection simultaneously to several, here six, connection points, which are disposed in a common connection plane 36, such as is the case with so-called Tape-Automated-Bonding (TAB).

Figure 3:
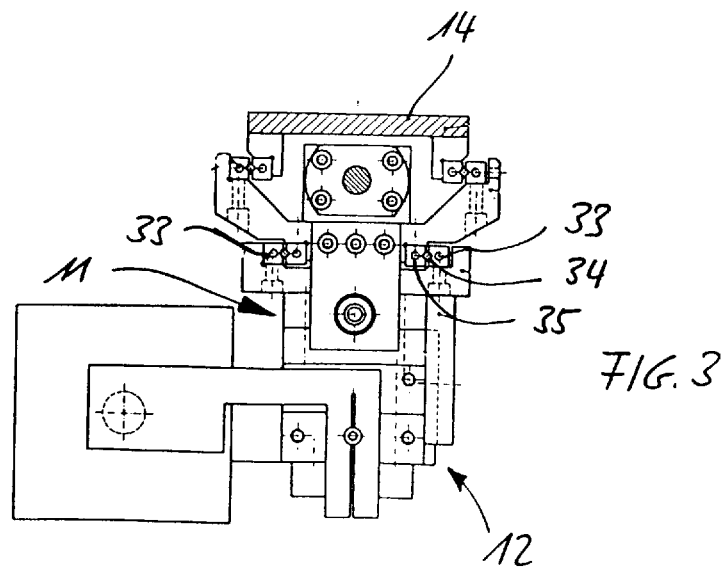
FIG. 3 shows the take-up/guide apparatus of FIG. 1 in a top view.

FIG. 3 shows the take-up/guide apparatus 10 in a top view, which exhibits especially well the design of the sled guides 13 and 22. In the embodiment shown, the sled guides respectively consist of two exterior rails 33, which in this case interact via cylinder roll elements 34 with interior rails 35. The sled guides 13, 22 can also be designed in any other arbitrary manner. However, as regards the accuracy with which the reaction force 30 (FIG. 1) is measured, solely the quality of the sled guide 22 of the take-up sled 12 is relevant as far as the sled guides are concerned.

In actual operation, the take-up/guide apparatus 10 is used in such a way that, starting from an initial position, first the feed sled 11 is moved downward, relative to the frame 14, in the direction toward the connection plane 36, until either a pressure-force signal is created by the force measurement device 28, that is the connection device 24 with its thermode inserts 31 makes contact with the connection plane 36, or else a preset distance between the connection device 24 and the connection plane 36 has been sensed by a positioning device, which is not shown here in more detail.

Depending on the magnitude of the pressure-force signal that is being generated, the feed sled 11 is now moved up or down by means of an appropriate rotary motion of the servomotor 15, until the desired pressure force is set, at which the connection is to be made. The take-up sled 12 here moves along its sled guide 22 relative to the feed sled 11. The force signal produced by the force measurement device 28 constantly is always analogous to the excursion of the spring 26 and is used to control the direction of rotation of the servomotor 15.

The take-up/guide apparatus 10 can also be used for on-line bond process control. For example, the wire deformation of the bond wire, which occurs while making a wire bond connection, is measured on-line. This measurement can be of a path difference, such that the pressure-force signal defines the first measurement point when the connection device 24 strikes the connection plane 36, and defines the second measurement point when the prescribed maximum pressure-force has been reached, and the intermediate path length traversed and/or sensed by the shaft encoder of the servomotor 15 or by another measurement transducer corresponds to the wire deformation of the bond wire.

Figure 4:
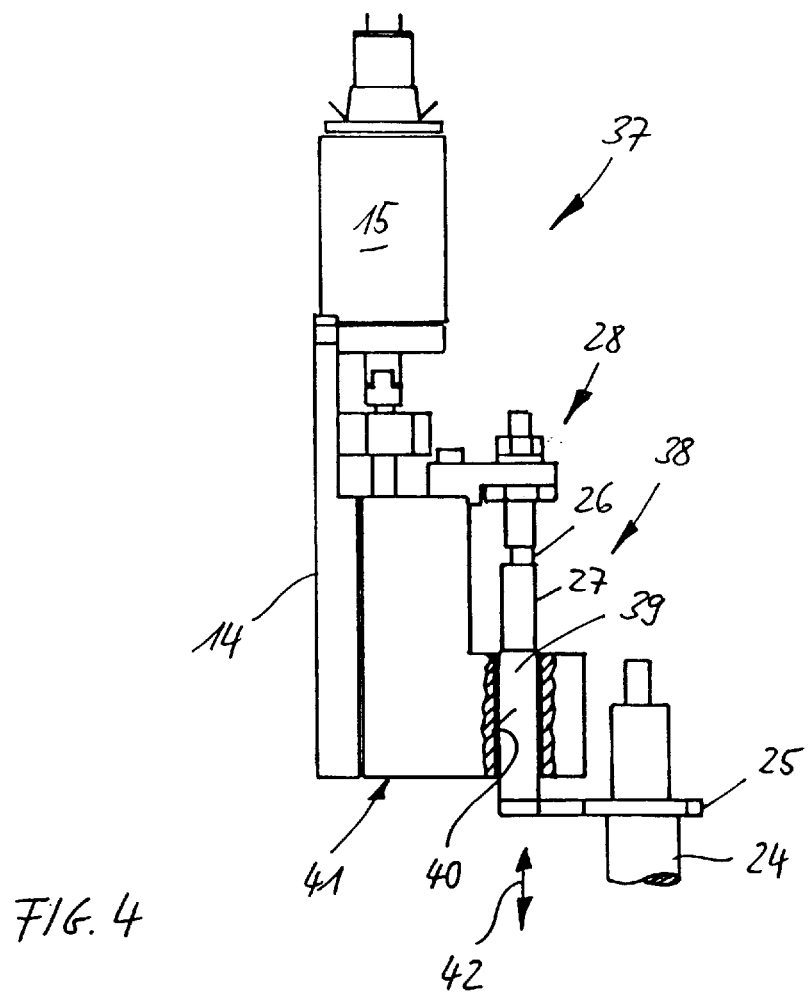
FIG. 4 shows another embodiment of the take-up/guide apparatus in a side view.

FIG. 4 shows another possible take-up/guide apparatus 37. In contrast to the take-up/guide apparatus 10, it has a take-up device 38 which is guided with a guide piston 39 in a guide bore 40 of a feed sled 41, in the direction of the double arrow 42, in such a manner that it can move back and forth. To form a guide which is as frictionless as possible, the guide bore 40 has a spherical liner, which is not shown in more detail, for linearly guiding the guide piston 39. Otherwise, the take-up/guide apparatus 37 is the same in its other details as the take-up/guide apparatus 10 described above.

We claim:

1. An apparatus for taking up and guiding a tool device, comprising:
    a feed device being movable by means of a servo-element along a feed axis,
    a take-up device for taking up the tool device, the take-up device being movable by means of the feed device along a motional axis,
    the motional axis being in parallel and offset to the feed axis,
    a force measuring device being disposed on the feed device and movable together with the feed device,
    an elastic element being disposed between and connected with the force measuring device and the take-up device,
    the take-up device being guided alongside the feed device in a linear guide in such a way that the elastic element is deformed when a relative motion takes place between the force measuring device and the take-up device.

2. The apparatus of claim 1, wherein, in order to move the feed device along the feed axis, a rotary drive coupled to the servo-element, is provided.

3. The apparatus of claim 2, wherein the rotary drive device is a spindle drive.

4. The apparatus of claim 1, wherein the feed device is designed as a feed sled, and a sled guide is provided to form the feed axis.

5. The apparatus of claim 4, wherein the take-up device is guided in a guide bore of the feed sled so as to form an axis of motion.

6. The apparatus of claim 1, wherein the take-up device is designed as a take-up sled, and a sled guide is provided at the feed sled so as to form the axis of motion.

7. The apparatus of claim 1, wherein the elastic element is designed as a spring.

8. The apparatus of claim 7, wherein the spring is a coil spring.

9. The apparatus of claim 1, wherein the force measuring device is a component of a control loop, in such a way that the output signal of the force measuring device serves as the current value for applying pressure to a connection point and as an input signal for an rpm-control device of the servo-element.

10. The apparatus of claim 9, wherein the servo-element is a electric motor.

11. The apparatus of claim 9, wherein a positioning device is associated with the servo-element, in such a way that the feed motion of the feed device can be executed at a rpm higher than a rotating velocity until a prescribed feed distance is reached between the connection device and a connection plane.

12. The apparatus of claim 9, wherein said control loop is an analog control loop, a force limiting element is associated with the force measuring device.

13. The apparatus of claim 12, wherein the a force limiting element is a potentiometer.

14. The apparatus of claim 1, wherein a microprocessor unit is associated with the force measuring device to form a digital control loop, so as to convert the analog output signal of the force measuring device into a digital output signal.

* * * * *